June 21, 1966    J. I. RUSSO    3,256,541
TAP HOLDER
Filed June 16, 1964    3 Sheets-Sheet 1
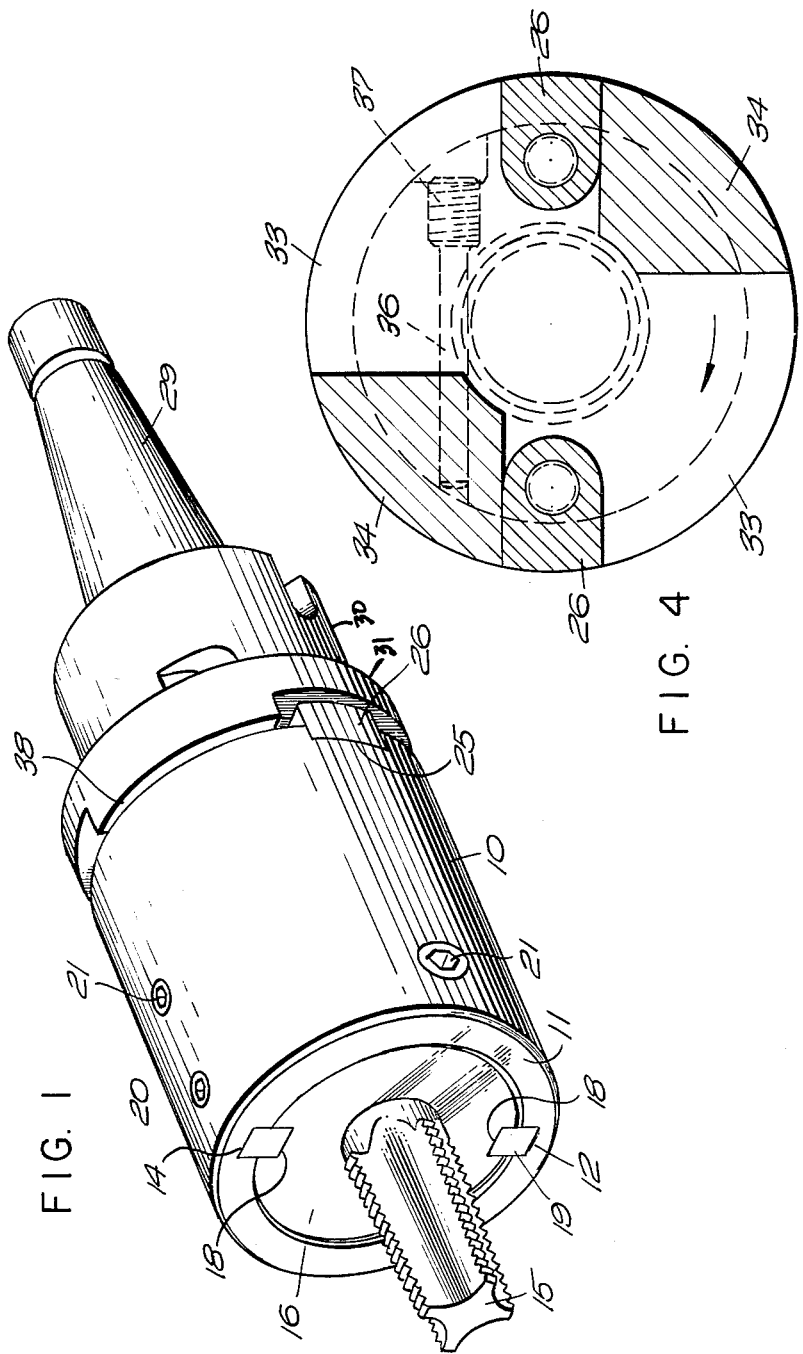
INVENTOR.
JOHN I. RUSSO
BY
Max Schwartz
ATTORNEY

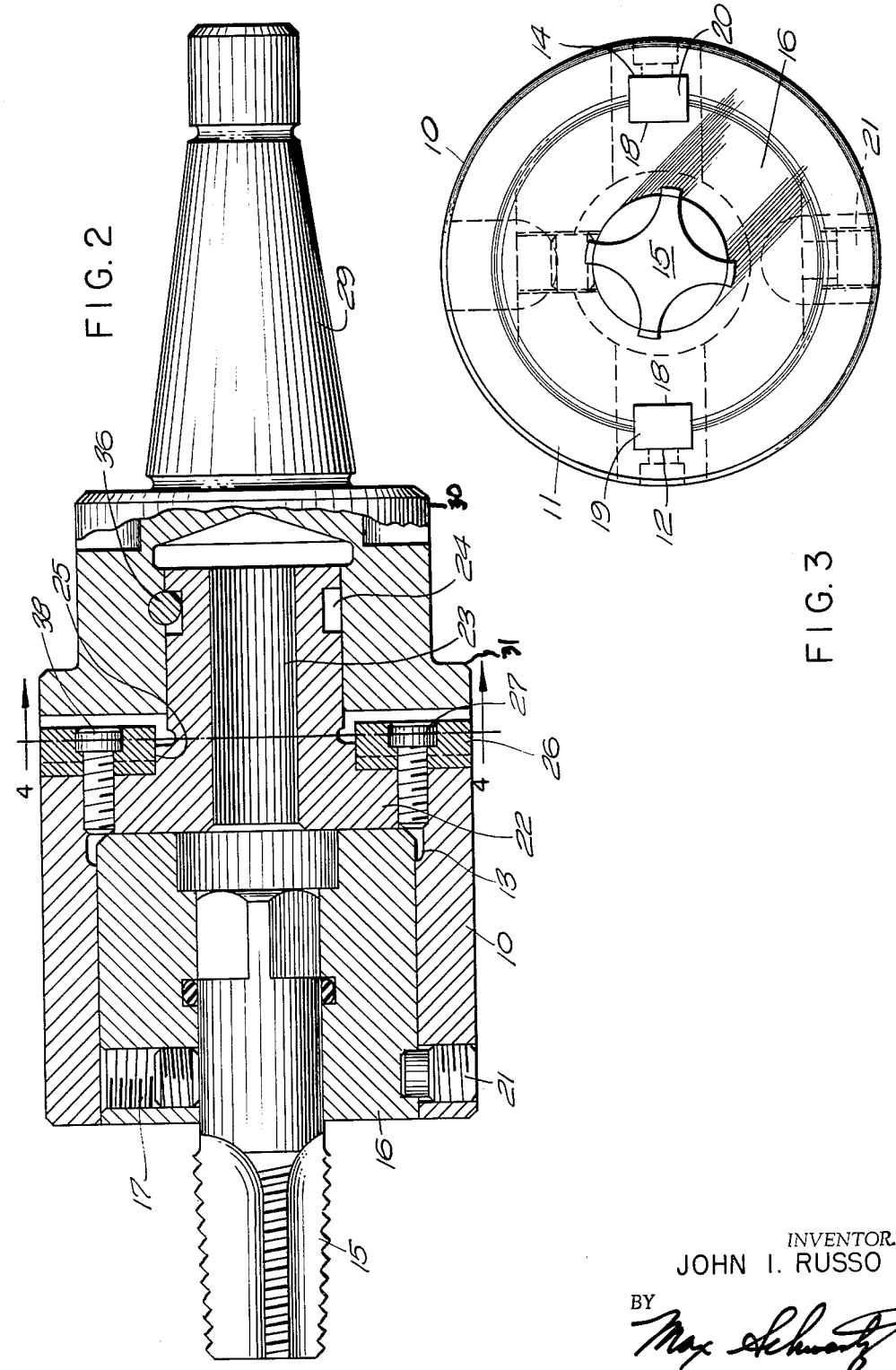

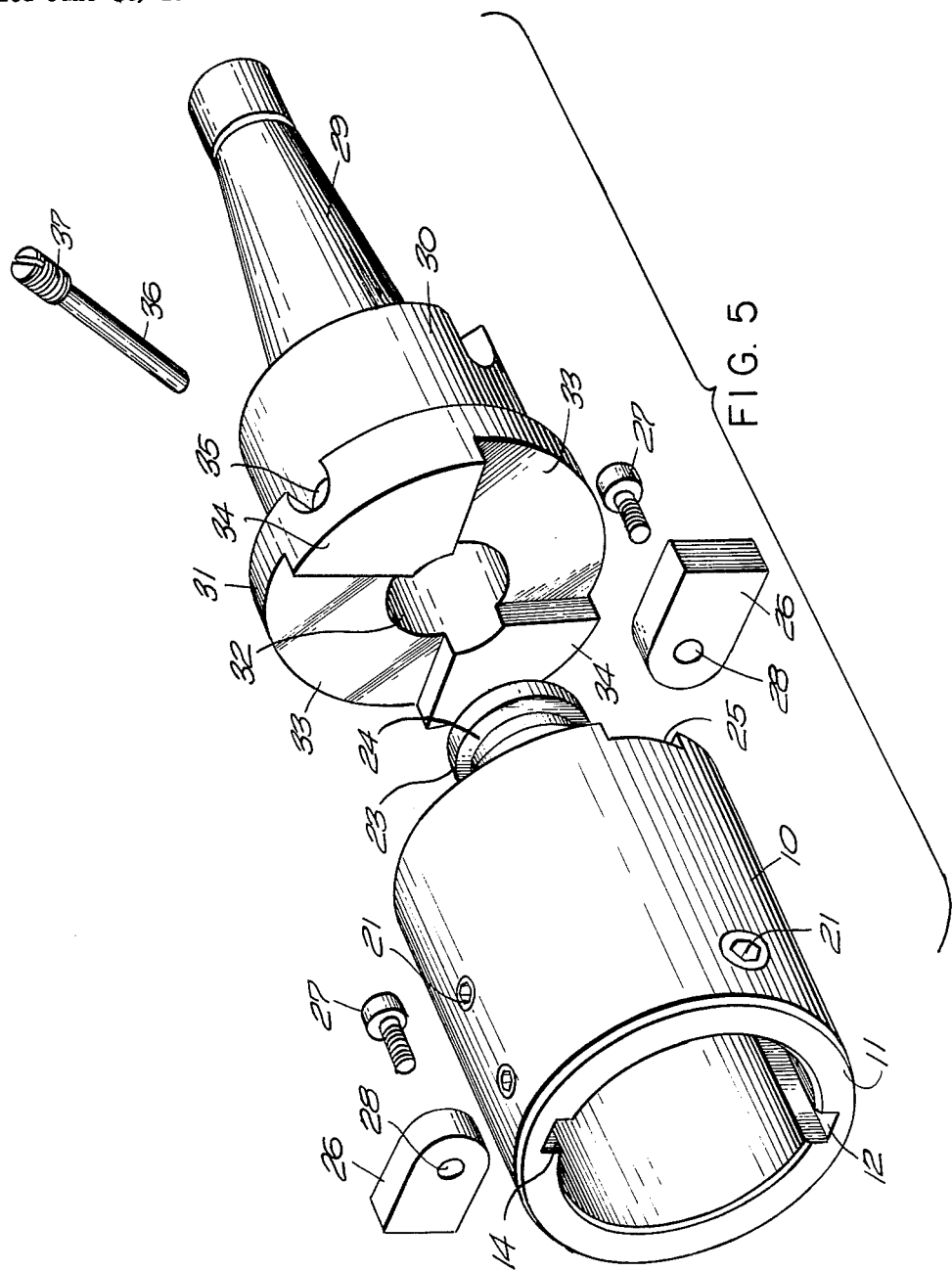

United States Patent Office 3,256,541
Patented June 21, 1966

3,256,541
TAP HOLDER
John I. Russo, Cranston, R.I., assignor of one-half to
Frank A. Ronci, Providence, R.I.
Filed June 16, 1964, Ser. No. 375,524
2 Claims. (Cl. 10—129)

My present invention relates to the machine tool art and more particularly to a novel construction of a tap holder.

The principal object of the present invention is to provide a holder for tapping or threading which greatly increases the life and accuracy of the tools.

Another object of the present invention is to provide a tap holder which adds approximately fifty percent to the efficiency of the motor.

A further object of the present invention is to provide a tap holder construction which permits the tool to follow the tap rather than drive it.

A further object of the present invention is to provide a tap holder construction which reduces the cost of the lead screw assembly.

Another object of the present invention is to provide a tap holder construction having the above advantages which is simple in construction and easy and economical to manufacture and assemble.

With the above and other objects and advantageous features in view, my invention consists of a novel arrangement of parts more fully disclosed in the detailed description following, in conjunction with the accompanying drawings and more particularly defined in the appended claims.

In the drawings,

FIG. 1 is a perspective view of a tap holder embodying the present invention with a tap mounted in position.

FIG. 2 is a longitudinal section of the tap holder shown in FIG. 1.

FIG. 3 is a front elevation of the tap holder.

FIG. 4 is a section taken on line 4—4 on FIG. 2.

FIG. 5 is an exploded perspective view of the tap holder.

Tapping or threading normally involves an accurate cutting of a metal surface into the form of threads internal or external. In the manufacture of pipes, valves, etc., a tool is provided for holding the tap and this in turn is positioned in a suitable mechanism for providing the driving force. Two problems immediately present themselves. First, sufficient motive power must be provided to turn the tap and drive it into the metal, reverse under full load, and then drive again. This is inherent in the tapping operation which is a back and forth movement until the thread is accurately formed. The second problem involves the forward thrust. A lead screw is provided with very accurate threads corresponding to the threads on the tap so that rotation in one direction will move the tap holder and tap forwardly and rotation in the opposite direction will move the tap holder and tap rearwardly. However, since the tap is cutting a thread of its own at this time, it is essential that the threads on the lead screw correspond accurately to those on the tap. Since this is a virtual impossibility, even the smallest slightest error multiplies itself during the operation so that the lead screw and its forward and rearward thrust is constantly fighting the tap. This results in inaccuracies in the thread, wear and tear on the tap and a great deal of heat.

The tap holder of the present invention is designed to overcome the above difficulties. The problem of power is met by providing a lost motion effect so that starting from any given position forward or reverse, the motor can attain almost top speed before meeting the load. Applicant's experience has shown that such a construction adds at least fifty percent to the efficiency of the motor by reducing the strain of starting with the full load. The second problem, that of the threads, is solved by the tap holder of the present invention by providing a lost motion effect axially to the tool. With this construction the accuracy of the lead screw threads is no longer necessary. Furthermore, the tap controls the amount of advance and the holder and drive follow. This not only reduces the strain on the tap but insures that the resultant thread is cut accurately to the gage of the tap.

Referring more in detail to the drawings, the holder 10 is in the form of a cylindrical housing having a smooth front edge 11. An internal keyway 12 extends inwardly from the front edge 11 as shown in FIG. 5 to a point 13, see FIG. 2, spaced from the rear wall. Diametrically opposite the keyway 12 is another keyway 14 parallel to the keyway 12 and extending rearwardly to the same extent. The tap 15 is mounted in a cylindrical block 16 and held in place by the set screw 17. The block 16 is of a length to fill the housing 10 as shown in FIG. 2. The block 16 is provided with complementary keyways 18 on diagonally opposite sides complementary to the keyways 12 and 14 as shown in FIG. 1. A key 19 is positioned in the keyways 12 and 18 and a key 20 is positioned in the keyways 14 and 18 to lock the cylindrical block 16 against rotation in the housing 10. Suitable set screws 21 are provided to lock the keys 20 and the cylindrical block 16 within the housing 10.

As shown in FIG. 2, the housing 10 is provided at the rear with a transverse integral wall 22 having an integral axially extending stud 23. Adjacent its outer end, the stud 23 is provided with an annular rectangular slot or groove 24, FIGS. 2 and 5. The rear wall portion 22 is provided with oppositely disposed axial slots 25. A key 26 is mounted in each slot 25 by means of the screw 27 extending through an opening 28 in each key into the rear wall portion 22 as shown in FIG. 2. As shown in FIG. 5, the keys 26 are provided with outer surfaces which blend into the outer surface of the housing 10 and with rounded inner surfaces to conform with the slots as shown in FIG. 4. However, the slots 25 are comparatively shallow and the keys 26 are approximately twice the thickness of the slots so that they extend rearwardly beyond the rear wall as shown in FIG. 2.

The tap holder is held in a suitable machine or lead screw device by any suitable fitting designed to fit into the available machinery. In the illustrated form a tapered shank 29 is designed to fit into the desired machinery. The shank 29 is provided at its forward end with an integral enlarged annular portion 30 terminating at its front end with an enlarged annular wall portion 31 of the same diameter as the housing 10. The holder 29 is provided with a central axial opening 32 extending into the front end and of a diameter to allow it to slide just over the stud 23 extending from the rear of the housing 10, see FIG. 5. The front face 33 of the wall portion 31 is provided with wedged shaped raised portions 34 on diametrically opposite sides of the front wall 33 as shown in FIG. 5. When the shank portion is positioned as shown in FIG. 5 so that the opening 32 can be slipped over the stud 23 into the position shown in FIGS. 1 and 2, the wedge shaped segments 34 abut the rear wall 22 of the housing 10 between the keys 26, see FIG. 4. The front wall portion 31 of the shank member is provided with a radial opening 35 which extends through to the central opening 32 as shown in FIG. 5. I now provide an elongated pin 36 having threads 37 adjacent its outer end. The pin 36 is positioned in the opening 35 and enters the annular slot or groove 24 in the stud 23 as shown in FIG. 2. When the parts are assembled into the position shown in FIG. 2, the pin 36 locks the shank portion on to the stud 23 of the housing 10. With the parts thus assembled, and viewing FIG. 2, it should be noted that the diameter of the pin 36 is such that it is approximately ⅛ inch less than the width of the slot 24. Also, there is approximately ⅛ inch space 38 between the end wall 33 of the shank portion and the rear wall 22 of the housing 10.

With the parts assembled as illustrated, a lost-motion effect is created in the axial drive as is more clearly illustrated in FIG. 4. When the motor is driving clockwise as seen in FIG. 4, the rear shank portion must move until the segment 34 at the lower right hand portion moves in the direction of the arrow until it contacts the key 26 at the left. It then engages the housing 10 at the key 26 and causes rotation of the housing. In reverse, the segment 34 must now move until it engages the opposite key 26. The thickness of the keys 26 and the size of the wedge shaped segments 34 control the amount of lost motion. However, it is this lost motion that permits the motor to get up to speed before it engages the load at the keys 26. This means that each time it reverses itself it is moving freely and does not have to start with a full load. Applicant has found that the efficiency of the motor is increased by at least fifty percent. Certainly, the strain is taken off the motor and its life is lengthened.

The shank 29 is the driven member. As it turns it is moved forwardly by the conventional lead screw construction. Rotation of the shank 29 causes rotation of the housing 10 through the lost motion effect above described. Now rotation of the tap 15, as it is cutting its thread, will cause it to move forwardly. However, the shank 29 does not thrust the housing forwardly but follows it. It is no longer necessary to balance the threads on the lead screw construction with the threads on the tap. It will be noted that the only connection between the shank portion 29 and the housing 10 is through the pin 36. This is sufficient because there is no axial strain between the parts. Because of the fact that the pin 36 is permitted to move ⅛ inch in axial direction in its slot 24 and because of the fact that there is ⅛ inch spread 38 between the ends of the members 33 and 22, there is ⅛ inch play between the shank portion and the housing portion. This ⅛ inch makes up for any differences between the threads on the lead screw device and the threads on the tap 15. Since the margin of error is actually measurable in small thousandths, the ⅛ inch is sufficient to provide any foreseeable error in the construction of the parts. With this construction, the entire device actually follows the tap rather than thrusts the tap forwardly. The strain is taken off the various parts and the tap runs cool. Other advantages of the present invention will be readily apparent to a person skilled in the art.

I claim:

1. A tap holder comprising a cylindrical housing open at the front end, means for locking a tap or the like in said housing, a rear wall on said housing, means for mounting said holder in a machine, and means for coupling said mounting means to said housing rear wall, said coupling means providing a lost motion between said housing and said mounting means on reciprocating rotation of said mounting means, said coupling means providing an axial movement between said housing and said mounting means, said mounting means including a shank for mounting in a machine, an integral collar at the front of said shank, and a front annular wall portion on said collar of the same diameter as said housing, said coupling means including a stud extending axially from said rear wall, said stud having an annular groove, said mounting means having an axial opening for receiving said stud, and a lock pin extending chordally into said mounting means and tangentially into said stud groove to lock said housing to said mounting means.

2. A tap holder comprising a cylindrical housing open at the front end, means for locking a tap or the like in said housing, a rear wall on said housing, means for mounting said holder in a machine, and means for coupling said mounting means to said housing rear wall, said coupling means including a stud extending axially from said rear wall, said stud having an annular groove, said mounting means having an axial opening for receiving said stud, and a lock pin extending chordally into said mounting means and tangentially into said stud groove to lock said housing to said mounting means, the diameter of said lock pin being less than the width of said groove to permit relative axial movement between said housing and said mounting means, the rear wall of said housing having a pair of oppositely disposed keys extending from the surface thereof, the front wall of said mounting means having oppositely disposed wedge-shaped segments for engaging said keys on rotation of said mounting means to provide a lost-motion effect.

References Cited by the Examiner

UNITED STATES PATENTS

| | | | |
|---|---|---|---|
| 1,091,447 | 3/1914 | Wagner | 279—19.5 X |
| 1,763,717 | 6/1930 | Morgan | 10—141 |
| 2,224,063 | 12/1940 | Roberts | 279—19.5 |

FOREIGN PATENTS 550,004   12/1942   Great Britain.

ANDREW R. JUHASZ, *Primary Examiner.*